US012605998B2

(12) United States Patent
Kalinowski et al.

(10) Patent No.: US 12,605,998 B2
(45) Date of Patent: Apr. 21, 2026

(54) DRIVE ASSEMBLY FOR A MOTOR VEHICLE

(71) Applicant: Volkswagen Aktiengesellschaft, Wolfsburg (DE)

(72) Inventors: Piotr Kalinowski, Berlin (DE); Thomas Schroeder, Berlin (DE); Christoph Stelzer, Ruehen (DE); Robert Maria Bass, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 191 days.

(21) Appl. No.: 18/599,088

(22) Filed: Mar. 7, 2024

(65) Prior Publication Data

US 2024/0300313 A1     Sep. 12, 2024

(30) Foreign Application Priority Data

Mar. 7, 2023     (DE) ..................... 10 2023 202 044.0

(51) Int. Cl.
    *H02G 3/08*     (2006.01)
    *B60K 1/00*     (2006.01)
    *B60R 16/02*     (2006.01)
(52) U.S. Cl.
    CPC ............ B60K 1/00 (2013.01); B60R 16/0207 (2013.01)
(58) Field of Classification Search
    CPC . H02G 3/08; H02G 3/081; B60K 1/00; B60K 1/02; B60K 2001/001; B60R 16/0207; B60R 16/02; B60R 16/00; H05K 5/00;

H05K 5/02; H02K 5/24; H02K 7/08; H02K 7/10; H02K 11/0094; H02K 5/161; H02K 5/225; H02K 5/04
USPC .... 174/50, 520, 535, 544, 559; 220/3.2, 3.3, 220/4.02; 361/600, 601, 679.01
See application file for complete search history.

(56) References Cited

U.S. PATENT DOCUMENTS 5,801,330 A * 9/1998 Gademann .......... B60R 16/0239
                                                      174/559
7,427,447 B2     9/2008 Nishiumi
9,139,097 B2     9/2015 Chamberlin et al.
                        (Continued)

FOREIGN PATENT DOCUMENTS

CN          113263948 A      8/2021
CN          113765254 A     12/2021
                        (Continued)

*Primary Examiner* — Angel R Estrada
(74) *Attorney, Agent, or Firm* — Muncy, Geissler, Olds & Lowe, P.C.

(57)                ABSTRACT

A drive assembly for a motor vehicle, having a drive with a housing, enclosing at least one electrical drive component and the housing wall of which is divided into a plurality of axially adjacent sections. The two axially terminal sections each form an axially removable cover of the housing. A support frame with frame-side bearing components which, together with the corresponding housing-side bearing components, form bearings for suspending the housing in the carrier frame, and an electrical connection between a housing-side connector, which is stationary relative to the housing and is connected to the electrical drive component in the housing interior, and a frame-side connector, which is stationary relative to the support frame and is connected or connectable to an electrical power supply.

8 Claims, 1 Drawing Sheet

(56)           References Cited

U.S. PATENT DOCUMENTS

| | | | |
|---|---|---|---|
| 9,692,277 | B2 | 6/2017 | Pearce et al. |
| 10,046,641 | B2 | 8/2018 | Penmetsa et al. |
| 11,472,308 | B2 | 10/2022 | Messina et al. |
| 11,737,225 | B2 * | 8/2023 | Pump .................. H05K 5/0247 |
| | | | 174/559 |
| 2013/0137303 | A1 | 5/2013 | Yazaki et al. |

FOREIGN PATENT DOCUMENTS

| | | | |
|---|---|---|---|
| DE | 10225694 | A1 | 4/2003 |
| DE | 102011016624 | A1 | 10/2012 |
| DE | 102012012327 | A1 | 12/2013 |
| DE | 102021214770 | A1 | 6/2023 |
| JP | 2012140052 | A | 7/2012 |

* cited by examiner

DRIVE ASSEMBLY FOR A MOTOR VEHICLE

This nonprovisional application claims priority under 35 U.S.C. § 119(a) to German Patent Application No. 10 2023 202 044.0, which was filed in Germany on Mar. 7, 2023, and which is herein incorporated by reference.

BACKGROUND OF THE INVENTION

Field of the Invention

The invention relates to a drive assembly for a motor vehicle, comprising a drive with a housing, enclosing at least one electrical drive component and the housing wall of which is divided into a plurality of axially adjacent sections, wherein the two axially terminal sections each form an axially removable cover of the housing, a support frame with frame-side bearing components which, together with the corresponding housing-side bearing components, form bearings for suspending the housing in the support frame, and an electrical connection between a housing-side connector, which is stationary relative to the housing and is connected to the electrical drive component in the housing interior, and a frame-side connector, which is stationary relative to the support frame and is connected or connectable to an electrical power supply.

Description of the Background Art

A drive assembly is known from U.S. Pat. No. 9,692,277 B2.

Traction machines in motor vehicles have to deliver high performances. In fully or partially electrified vehicle drives, high voltages and currents result accordingly. These prevail in particular in the electrical machine (EM), which converts electrical power into mechanical power (and vice versa in the case of recuperation), and in the power electronics, which typically fulfill the function of a pulse width modulated inverter (PWR) and convert the electrical energy provided by an electrical power supply, in particular a battery or fuel cell, into the current and voltage pattern required to control the electrical machine. The mechanical structure of such electric drives typically comprises a housing, which extends longitudinally in the axial direction of the electrical machine, with different housing sections. The gearbox is housed in the central section of the housing. Attached on one side of the gearbox is the electrical machine, which is mechanically connected to the gearbox via its rotor shaft. The power electronics, in particular the pulse width modulated inverter, are located on the other side of the gearbox. The axially terminal sections of the housing are designed as covers and are often referred to as EM covers and PWR covers for specification purposes. They are reversibly connected to the rest of the housing, for example, by screwing, and can be removed for disassembly, particularly in the axial direction.

Mechanically, such a drive is typically held in a support frame. On the one hand, this frame is largely rigidly connected to load-bearing parts of the motor vehicle and, on the other hand, to said drive in a vibration-damping manner. Rubber bearings are often used for this purpose. Such a rubber bearing comprises a frame-fixed bushing in which a rubber sleeve is fixed, in which in turn a bolt, rigidly connected to the housing, is located. The aforementioned generic publication discloses this type of rubber mounting, whereby the housing-side bearing components, i.e., said bolts, are fixed at a number of points on the periphery of the central gear section of the housing.

Further, an electrical connection, guided out of the housing, between the power electronics and the vehicle's electrical energy source is required, wherein there is no disclosure of this electrical connection in the aforementioned publication. Usually, however, a cable is used for this, which can be connected to a connector on the PWR cover by means of a plug-in connection.

Due to the high voltages prevailing inside the housing when the power supply is connected, utmost care must be taken during repair and maintenance work. In particular, it must be ruled out that openings are created to live areas inside the housing in the connected state. This applies in particular to the removal of the covers. It is not just a matter of ensuring that the cover cannot be easily removed completely; the creation of gaps or the like, through which, e.g., a tool could be inserted into the voltage-conducting areas, must also be avoided. The aforementioned generic publication does not address this problem.

However, U.S. Pat. No. 9,139,097 B2 attempts such. It envisages equipping every possible access to the housing interior with a magnetic switch which is connected to a control unit via a low-voltage control line. Opening the access leads to the actuation of the magnetic switch, which prompts the control unit to interrupt the high-voltage supply. This is effective in terms of the desired HV safety, but is extremely complex in terms of design and therefore expensive.

SUMMARY OF THE INVENTION

It is therefore an object of the present invention to make a generic drive assembly electrically safer.

This object is achieved in an example in that the housing-side bearing components are arranged on the end faces of the two axially terminal sections of the housing, the housing is inserted into the support frame axially precisely on both sides, and the electrical connection is designed such that it must be disconnected in order to remove the housing from the support frame.

An idea of the invention is, on the one hand, to make it impossible to open the housing cover purely mechanically when the drive is installed in the support frame and, on the other hand, to allow the drive to be removed from the support frame only when the electrical connection to the power supply is disconnected.

The latter aspect can be realized, for example, by using a sufficiently short electrical connection cable, which can only bridge the distance between the connectors when the housing is installed. Alternatively, a direct plug-in contact between a connector arranged on the housing and a connector arranged on the support frame would be conceivable, which is inevitably released as soon as the housing is moved relative to the support frame.

The first aspect, on the other hand, can be realized by two interacting partial features:

Firstly, the housing-side bearing components, i.e., the housing-side elements of the mechanical interface between the housing and the support frame, are not arranged axially in the center of the housing, as is known from the prior art. On the contrary, they are arranged axially at the ends, i.e., at the end faces of the two covers. The covers are thus assigned a dual function, namely, on the one hand (as previously known), as a cover for the voltage-carrying elements in the housing interior and, on the other hand, as a support for the mechanical mounting of the housing in the support frame.

Secondly, the housing and support frame are dimensioned relative to each other so that the axial gap provided by the support frame to accommodate the housing corresponds exactly to the axial outer dimensions of the housing. In the installed state, there is therefore no space at all in the axial direction into which space one of the covers could be pulled off axially. There is no room for even a slight axial relative movement of the cover with respect to the rest of the housing, which could lead to a formation of a gap. Only after loosening the bearing and removing the housing—during which the electrical connection is inevitably loosened or must be loosened—is it possible to remove the cover from the rest of the housing. In this state, however, the housing interior is de-energized due to the separated connection to the electrical power supply. The requirements for maximum HV safety are therefore met.

It is provided that the end face of at least one of the covers can have an axially projecting mounting seat, the tip of which carries the housing-side bearing component. On the one hand, this makes it easier to install and remove the drive from the support frame and, on the other hand, it focuses the mechanical forces on the bearing region, so that this bearing can act even more precisely.

The bearing can be carried out via so-called rubber bearings; i.e., at least one of the frame-side bearing components is advantageously designed as a frame-fixed bushing in which a rubber sleeve is fixed, in which a bearing bolt fixed to the associated housing-side bearing component on the associated cover of the housing is mounted. This bolt can preferably be screwed to the cover. In this embodiment, the rubber sleeves are first inserted into the bushings of the frame during assembly. The drive is then inserted precisely between the bearing points. Screw bolts, inserted axially from the outside through the rubber sleeves, are then screwed into corresponding threads in the end faces of the covers so that the entire drive is secured vibration-damped and axially in the support frame.

In order to prevent axially centered regions of the drive or the housing, for example, the central gearbox region, from being able to be removed radially in the installed state, it is preferable provided that all sections of the housing are connected to each other by means of exclusively axially effective screw connections. In fact, the basic disassembly of the housing is maintained thereby—but not when the drive is installed in the support frame. To further or alternatively support this aspect, the individual housing sections can overlap in areas in the axial direction.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
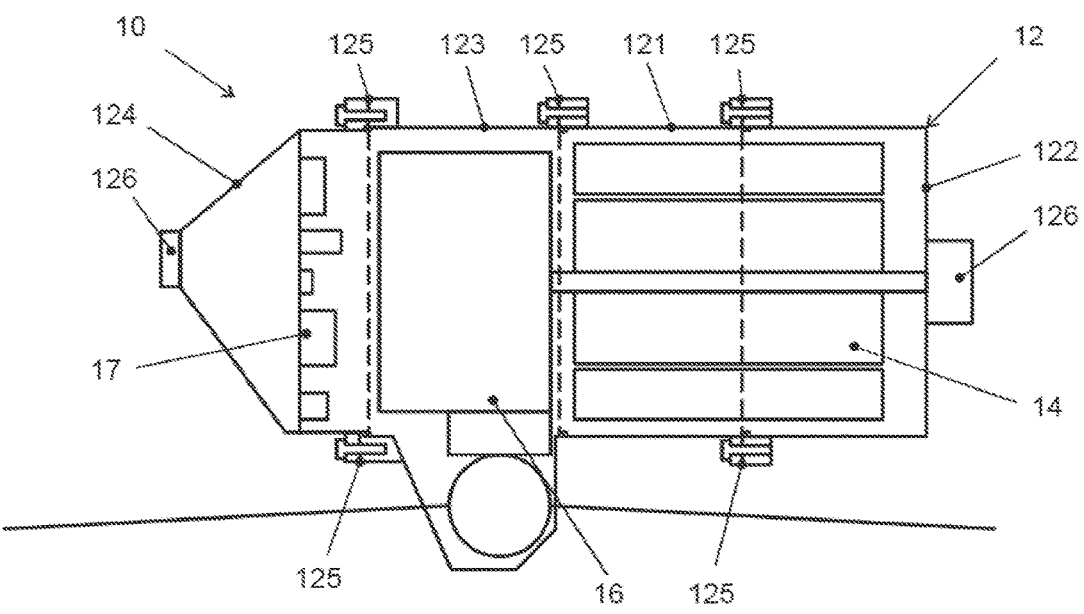
FIG. 1 is a highly schematized sectional view of a drive for use in a drive assembly of the invention.
Figure 2:
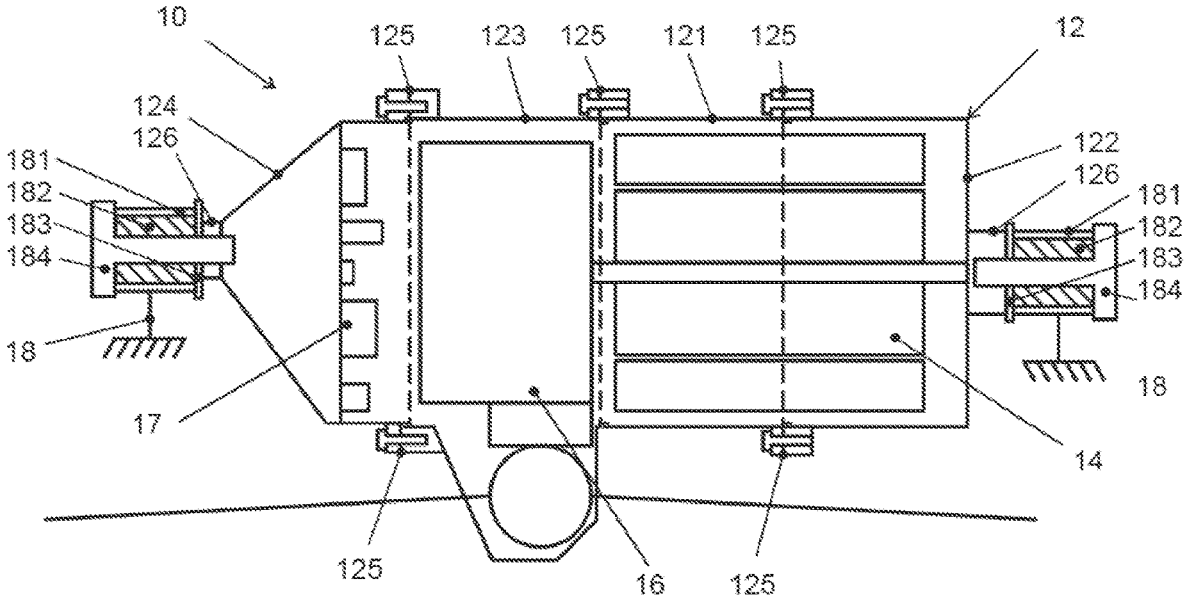
FIG. 2 is a highly schematized representation of a drive assembly of the invention.

FIG. 1 shows, in a highly schematized representation, the longitudinal section of a drive 10 for use in a drive assembly 1 of the invention, which is shown in FIG. 2. Drive 10 comprises a housing 12, which is composed of a plurality of axial sections. In particular, a motor housing 121 is provided which contains an electrical machine 14 and can be closed by means of a cover, which is referred to here as an EM cover 122 and which itself represents a housing section. Further, housing 12 comprises a gearbox housing 123 in which a gearbox 16 is disposed. Gearbox housing 123 can also be closed by means of a cover which itself constitutes a housing section and which, in one embodiment, covers power electronics 17, in particular a pulse width modulated inverter, attached to gearbox housing 123 and is therefore referred to here as PWR cover 124. The advantage of this embodiment is a decoupling of power electronics 17 from the forces acting on the PWR cover 124 from the bearing component. In another embodiment, PWR cover 124 could also comprise power electronics 17. In this case, power electronics 17 is premounted or fastened in PWR cover 124 and is then mounted together with it onto gearbox housing 123. The advantage of this embodiment is the simpler and faster assembly of the drive assembly. The aforementioned housing sections 121-124 are connected to one another by means of purely axially acting screw connections 125. FIG. 1 graphically indicates the possibility that the individual sections of housing 12 not only rest against each other via flat flanges in which screw connections 125 are realized, but also overlap each other in areas in the axial direction. This ensures that none of the housing sections can be removed in the radial direction. Rather, this completely ensures that the individual housing sections can only be separated in a number of directions, wherein two adjacent elements would have to be drawn apart axially by more than the overlap width in order to open a gap between them through which a tool or the like could be inserted into the housing interior.

The two covers 122, 124 are equipped with mounting seats 126 on their end faces. Mounting seats 126 serve to couple drive 10 to a support frame 18, which is connected to load-bearing structures of a motor vehicle in the final assembly position. The installation position of drive 10 in support frame 18, which is only indicated, is shown in FIG. 2. In particular, support frame 18 has two mutually opposite bushings 181, which accommodate rubber sleeves 182 acting as bearings. The rubber bearings designed in this way are equipped with support washers 183 axially inwards, i.e., towards drive 10. Conveniently, the rubber bearings are mounted in support frame 18 before drive 10 is installed. The distance between support washers 183 corresponds exactly to the axial outer dimensions of drive 10 between its mounting seats 126. During installation, as shown in FIG. 2, drive 10 can therefore be inserted axially precisely between the rubber bearings, in particular in contact with support washers 183 on both sides. Drive 10 can then be fixed in place by means of bearing bolts 184 passing through rubber sleeves 182, for example, by screwing said bearing bolts 184 into mounting seats 126.

In this way, all sections 121 to 124 of housing 12 are braced with one another and (vibration-damped) with support frame 18. Opening housing 12, in particular removing one of the covers 122, 124 is precluded in the installed state. Instead, it is necessary to first remove the entire drive 10 from support frame 18 in order to dismantle housing 12, wherein a suitable design of the electrical connection of power electronics 17 or electrical machine 14 to an external electrical power supply can ensure that such a removal is only possible when the electrical connection is disconnected. For example, a connecting cable can be dimensioned accordingly short. Alternatively, a direct plug-in connection can be realized between drive 10, in particular housing 12 and another fixed structure of the vehicle, e.g., support frame 18, which automatically leads to a disconnection of the electrical connection when drive 10 is lifted out of frame 18.

The invention thus ensures that opening housing 12, which makes high-voltage areas inside it accessible from the outside, is only possible in situations in which the electrical connection to the voltage source is disconnected. This represents the highest level of HV safety.

Of course, the embodiments discussed in the detailed description and shown in the figures are only illustrative exemplary embodiments of the present invention. In the light of the present disclosure, the skilled artisan is provided with a wide range of possible variations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drive assembly for a motor vehicle, the drive assembly comprising:

a drive with a housing enclosing at least one electrical drive component, the housing being divided into a plurality of axially adjacent sections, the axially adjacent sections including two axially terminal sections that each form an axially removable cover of the housing;

a support frame with frame-side bearing components which, together with corresponding housing-side bearing components, form bearings for suspending the housing in the support frame; and an electrical connection between a housing-side connector, which is stationary relative to the housing and is connected to the at least one electrical drive component in a housing interior, and a frame-side connector, which is stationary relative to the support frame and is connected or connectable to an electrical power supply, wherein the housing-side bearing components are arranged on an end face of each of the axially removable covers of the housing, wherein the housing is inserted into the support frame axially precisely at the housing-side bearing components on the end face of each of the axially removable covers of the housing, wherein the electrical connection is designed such that the electrical connection must be disconnected in order to remove the housing from the support frame, and wherein the electrical connection is a cable whose short length does not allow the removal of the housing from the support frame without first disconnecting the cable from at least one of the housing-side or frame-side connectors.

2. The drive assembly according to claim 1, wherein the end face of each of the axially removable covers has an axially projecting mounting seat, a tip of which carries or forms a respective one of the housing-side bearing components.

3. The drive assembly according to claim 1, wherein at least one of the frame-side bearing components is frame-fixed bushing in which a rubber sleeve is fixed, and wherein a bearing bolt is inserted through the rubber sleeve to fix to the associated housing-side bearing component on the associated axially removable cover of the housing.

4. The drive assembly according to claim 3, wherein the bearing bolt is screwed to the axially removable cover.

5. The drive assembly according to claim 1, wherein all of the axially adjacent sections of the housing are connected to each other via axially effective screw connections.

6. The drive assembly according to claim 1, wherein the housing encloses an electrical machine, a gearbox mechanically coupled to the electrical machine, and power electronics electrically connected to the electrical machine, wherein the electrical machine and the power electronics are arranged in the two axially terminal sections of the housing.

7. A drive assembly for a motor vehicle, the drive assembly comprising:

a drive with a housing enclosing at least one electrical drive component, the housing being divided into a plurality of axially adjacent sections, the axially adjacent sections including two axially terminal sections that each form an axially removable cover of the housing;

a support frame with frame-side bearing components which, together with corresponding housing-side bearing components, form bearings for suspending the housing in the support frame; and an electrical connection between a housing-side connector, which is stationary relative to the housing and is connected to the at least one electrical drive component in a housing interior, and a frame-side connector, which is stationary relative to the support frame and is connected or connectable to an electrical power supply, wherein the housing-side bearing components are arranged on an end face of each of the axially removable covers of the housing, wherein the housing is inserted into the support frame axially precisely at the housing-side bearing components on the end face of each of the axially removable covers of the housing, wherein the electrical connection is designed such that the electrical connection must be disconnected in order to remove the housing from the support frame, and wherein the electrical connection is a direct plug-in connection between a plug component fixed to the housing and a plug component fixed to the support frame.

8. A drive assembly for a motor vehicle, the drive assembly comprising:

a drive with a housing enclosing at least one electrical drive component, the housing being divided into a plurality of axially adjacent sections, the axially adjacent sections including two axially terminal sections that each form an axially removable cover of the housing;

a support frame with frame-side bearing components which, together with corresponding housing-side bearing components, form bearings for suspending the housing in the support frame; and an electrical connection between a housing-side connector, which is stationary relative to the housing and is connected to the at least one electrical drive component in a housing interior, and a frame-side connector, which is stationary relative to the support frame and is connected or connectable to an electrical power supply, wherein the housing-side bearing components are arranged on an end face of each of the axially removable covers of the housing, wherein the housing is inserted into the support frame axially precisely at the housing-side bearing components on the end face of each of the axially removable covers of the housing, wherein the electrical connection is designed such that the electrical connection must be disconnected in order to remove the housing from the support frame, wherein at least one of the frame-side bearing components is a frame-fixed bushing in which a rubber sleeve is fixed, and wherein a bearing bolt is inserted through the rubber sleeve to fix to the associated housing-side bearing component on the associated axially removable cover of the housing, and wherein the bearing bolt is screwed into threads provided in the end face of the associated axially removable cover.

* * * * *